United States Patent
Gold

(10) Patent No.: US 9,469,246 B1
(45) Date of Patent: Oct. 18, 2016

(54) MOTOR VEHICLE SIDE DOOR FRAME HAVING LUMINANT COMPONENT

(71) Applicant: Peter Gold, Rockville Centre, NY (US)

(72) Inventor: Peter Gold, Rockville Centre, NY (US)

(*) Notice: Subject to any disclaimer, the term of this patent is extended or adjusted under 35 U.S.C. 154(b) by 0 days.

(21) Appl. No.: 14/976,630

(22) Filed: Dec. 21, 2015

Related U.S. Application Data

(60) Continuation-in-part of application No. 14/748,877, filed on Jun. 24, 2015, now Pat. No. 9,308,859, which is a continuation-in-part of application No. 14/518,654, filed on Oct. 20, 2014, now Pat. No. 9,108,569, which is a division of application No. 14/062,010, filed on Oct. 24, 2013, now Pat. No. 8,894,256, which is a continuation-in-part of application No. 13/757,087, filed on Feb. 1, 2013, now Pat. No. 8,596,840, which is a continuation of application No. 13/110,327, filed on May 18, 2011, now Pat. No. 8,382,350.

(51) Int. Cl.
  *B60Q 1/32* (2006.01)
  *B60J 5/04* (2006.01)
  *B60Q 3/02* (2006.01)

(52) U.S. Cl.
  CPC ............ *B60Q 3/0289* (2013.01); *B60J 5/04* (2013.01); *B60Q 3/0213* (2013.01); *B60Q 3/0216* (2013.01)

(58) Field of Classification Search
  CPC .. B60Q 1/0035; B60Q 1/2669; B60Q 1/323; B60Q 3/0216; B60J 5/0402
  See application file for complete search history.

(56) References Cited

U.S. PATENT DOCUMENTS

| | | | | |
|---|---|---|---|---|
| 2,078,103 A * | 4/1937 | Simmons | ............... | G08B 5/004 359/516 |
| 2,561,756 A * | 7/1951 | Shook | .................... | B60Q 1/323 362/495 |
| 2,844,810 A * | 7/1958 | Steele, Jr. | ............... | B60Q 1/323 340/425.5 |
| 2,859,662 A * | 11/1958 | Rider | .................... | B60Q 1/323 359/549 |
| 3,590,768 A * | 7/1971 | Shanok | .................... | B60R 13/04 116/28 R |
| 4,443,056 A * | 4/1984 | Sullivan | ................. | G08B 5/004 359/516 |
| 4,601,538 A * | 7/1986 | Valkenburg | ............ | G08B 5/004 359/519 |
| 5,193,895 A * | 3/1993 | Naruke | .................. | B60Q 1/323 362/249.01 |
| 5,796,519 A * | 8/1998 | Gold | ........................ | B60Q 1/30 359/533 |
| 6,244,734 B1 * | 6/2001 | Hulse | ................... | B60Q 1/0011 362/495 |
| 8,079,742 B2 * | 12/2011 | Iwai | ...................... | B60Q 1/323 362/495 |
| 2009/0180292 A1 * | 7/2009 | Yang | ...................... | B60Q 1/323 362/488 |
| 2015/0138818 A1 * | 5/2015 | Salter | ................. | H05B 37/0218 362/510 |

FOREIGN PATENT DOCUMENTS

FR        2728210 A1 *  6/1996 ............. B60Q 1/323

* cited by examiner

*Primary Examiner* — Ismael Negron
(74) *Attorney, Agent, or Firm* — Galgano IP Law PLLC; Thomas M. Galgano; Jessica G. McDonald

(57) ABSTRACT

A motor vehicle door assembly including a motor vehicle door frame, a door hingeably connected to the frame, and a luminant component applied to overlie at least a portion of the motor vehicle door frame, so that the luminant component reflects light outwardly from the motor vehicle door frame.

10 Claims, 13 Drawing Sheets

MOTOR VEHICLE SIDE DOOR FRAME HAVING LUMINANT COMPONENT

CROSS-REFERENCE TO RELATED APPLICATIONS

This application is a continuation-in-part of U.S. patent application Ser. No. 14/748,877, filed Jun. 24, 2015; which is a continuation-in-part of U.S. patent application Ser. No. 14/518,654, filed Oct. 20, 2014, which issued as U.S. Pat. No. 9,108,569 on Aug. 18, 2015; which is a divisional of U.S. patent application Ser. No. 14/062,010, filed Oct. 24, 2013, which issued as U.S. Pat. No. 8,894,256 on Nov. 25, 2014; which is a continuation-in-part of U.S. patent application Ser. No. 13/757,087, filed Feb. 1, 2013, which issued as U.S. Pat. No. 8,596,840 on Dec. 3, 2013; which is a continuation of U.S. patent application Ser. No. 13/110,327, filed May 18, 2011, which issued as U.S. Pat. No. 8,382,350 on Feb. 26, 2013.

BACKGROUND OF THE INVENTION

1. Field of the Invention

This invention relates broadly to automotive safety. More particularly, it relates to illuminating parts of a vehicle so that it can be more easily seen in the dark or in fog or to create an illuminated signal. Most specifically, it relates to trim for car doors, car door frames, and car door window frames where the trim is luminous or luminant, i.e., reflective or illuminated by LED lights or the like.

2. State of the Art

There have been many ambitious suggestions to improve the visibility of motor vehicles in dim lighting conditions such as at night or in the fog.

My prior U.S. Pat. No. 5,163,731, issued in 1992, discloses a vehicle rear window reveal molding provided with a rearwardly facing groove serving as a repository for reflective material in which the overhang of an upper leg of the groove shelters the reflective material against ultraviolet deterioration but allows clear visibility thereof in its activated state when it emits light in response to ground level light of headlights from approaching vehicles impinging on the reflective material.

My prior U.S. Pat. No. 5,523,926, issued in 1996, discloses an improvement to promote safer use of an industrial van of a type having a body with right and left pivotally hinged doors usually opened preparatory to workmen working out of the rear of the van. An additional taillight is located on a cooperating edge of each of the doors in facing relation to an oncoming motorist to mark the stationary van as a road obstruction.

My prior U.S. Pat. No. 5,560,702, issued in 1996, discloses an improvement for a popular dome-shaped industrial van having rear left and right doors. The improvement includes an added pair of taillights at the top of the van rear edge to which the doors are hinged. In the location noted, the tail lights are visible to an oncoming motorist when the doors are open through the clearance bounded by the outwardly diverging van rear edges and upper door edges, thus contributing to safer use during loading and unloading of the industrial van.

My prior U.S. Pat. No. 5,613,755, issued in 1997, discloses a cyclops light as now mandated by law on the panel above the rear doors of a van but relocated as side-by-side lights to the inside adjacent corners of the doors. Each light is provided with a side lens so that when a door is open, as when loading and unloading the van, the light is seen through the side lens as a safety signal to a motorist approaching from the rear. The light seen through the previously used rear lens is still in use, but as a safety signal to a motorist approaching from the front in a passing lane.

My prior U.S. Pat. No. 5,668,530, issued in 1997, discloses a rearwardly facing three-light display of a parked van to inform an approaching motorist if one, both or none of the rear doors are open, using to advantage lights that are illuminated in the display and also lights, although illuminated, that are not seen by the approaching motorist because of being masked from view by an open door, resulting in three possible light displays which, as a result of driver education, will inform the approaching motorist of the open and closed condition of the rear doors of the parked or stationary van.

My prior U.S. Pat. No. 5,711,593, issued in 1998, discloses a cyclops light as mandated by law on the panel above the rear doors of a van but which is relocated as side-by-side lights to the inside adjacent corners of the doors and each provided with a triad lens so that, when a door is open, as when loading and unloading the van, the light now seen through the triad lens is a safety signal to a motorist approaching from the rear, and the light seen through the previously used rear lens is still in use, but as a safety signal to a motorist approaching from the front in a passing lane.

My prior U.S. Pat. No. 5,796,519, issued in 1998, discloses an added visual display strip for a popular dome-shaped industrial van having rear left and right doors. There is an added visual display strip at the top of the van rear edge to which the doors are hinged, which in the location noted, are visible to an oncoming motorist when the doors are open through the clearance bounded by the outwardly diverging van rear edges and upper door edges, thus contributing to safer use during loading and unloading of the industrial van.

My prior U.S. Pat. No. 5,842,770, issued in 1998, discloses taillights which are located adjacent the hinge axis of, and on van right and left doors, so that a closed door displays the taillight to traffic approaching the van from the rear. Also after a door pivotal traverse into an open condition there is a display of the taillight to traffic approaching the van from the front.

My prior U.S. Pat. No. 5,852,400, issued in 1998, discloses a van rear door light display having reflectors for impinging light from headlights of approaching traffic, which reflectors are positioned rearwardly when the doors are opened, as when the van is loaded and unloaded, and are strategically at different heights on the edges of the doors to obviate contact therebetween when the doors are closed.

My prior U.S. Pat. No. 5,864,429, issued in 1999, discloses a van rear door window reflective tape to provide a light display when coacting with a headlight beam of an approaching motorist that is on an inside, rather than outside, window surface so that the door of a parked van when open provides the referred-to light display and, when the door is closed and the van backed into a garage, the reflective tape coacts with a van interior rear light to provide a light display that conveys a sense of the length of the van and facilitates the parking maneuver.

My prior U.S. Pat. No. 5,864,439, issued in 1999, discloses an added light display for alerting traffic passing left and right of a moving or parked van which is effected by converting an unused gap involved in the sealing of the peripheral edge against weather elements of the rearwardly facing van windows into a light display compartment for a light-reflecting strip, thus providing a supplementing light display contributing to safer use of the van at nominal expense and effort.

My prior U.S. Pat. No. 8,382,350, issued Feb. 26, 2013, and discloses a luminant trim which can be seen in the dark and which is applied to overlie a portion of an inner and outer face of a car door window frame. As a result, the luminant trim reflects light both on the inside and the outside of the door.

U.S. Pat. No. 4,904,508, issued in 1990 to Ciro Madonia describes a trim strip suitable for attachment to surfaces requiring highlights, such as edges of vehicle moveable closures including doors and trunk lids, is provided with a light reflective surface portion to outline the edge of the moveable closure member. A decorative continuation to the strip surface can be provided that is visible on the outer surface of the moveable closures such as doors. The strip is transversely and longitudinally deformable in order to conform to the usual radii of a door or other mounting surface, and may be of metal, or plastic or other suitable construction. The strip may embody clear protective finishes to minimize ultra-violet degradation of the colored surface. The strip can serve additionally as edge bumper protection and usually incorporates a pressure sensitive adhesive on the obverse surface thereof. However, mechanical attachment may be used to attach the strip to the surface being highlighted. A surface discontinuity or ridge may be provided to separate the two adjoining visual finish surfaces. The highlight surface of the strip can incorporate, reflective or fluorescent or a combined reflective and fluorescent finish, to afford visual highlighting under predetermined lighting condition.

U.S. Pat. No. 5,475,947 issued in 1995 to Ronald E. Dupuy describes a sealing unit for a movable window of a vehicle. The sealing unit includes a one-piece, elongated, flexible sealing member having a first portion for mounting the sealing unit to a frame of a vehicle and a second portion for receiving the movable window, and a flexible, decorative trim associated with a surface of the sealing member that is viewable from the exterior of the vehicle when the sealing unit is mounted to the frame. Both the sealing member and the decorative trim are sufficiently flexible to permit the sealing unit to conform to the contour of the frame when the sealing unit is mounted to the frame in a single mounting operation to provide a substantially continuous seal between the frame and the sealing unit.

The above referenced patents may increase the visibility of a motor vehicle in the dark or fog, but as will be seen from the following description of the present invention, they have certain shortcomings.

SUMMARY OF THE INVENTION

It is therefore an object of the invention to provide a novel method and apparatus for illuminating a car door.

It is another object of the invention to provide an apparatus to illuminate a car door which has a relatively simple construction and is easy to install.

It is yet another object of the invention to provide an apparatus to illuminate a car door which can be seen through the window, whether it is up or down, when the door is closed, as well as, if desired, when the door is open.

It is a further object of the invention to provide an apparatus to illuminate a car door which is simple, easy and inexpensive to manufacture and install.

It is another object of the invention to provide an apparatus incorporating one or a plurality of lights to illuminate the car window frame.

It is yet another object of the invention to provide an apparatus which can connect the lights to pre-existing circuitry in a car's electrical system.

It is also an object of the invention to provide an apparatus which provides various signals via the car window frame.

It is a further object of the invention to provide an apparatus which illuminates a car door having a tinted window.

It is yet another object of the present invention to provide a reflective trim on a car door flange or car door flange gasket to serve as a vehicle door accident avoidance system.

It is an additional object of the present invention to provide a reflective trim on a car door frame, to serve as a vehicle accident avoidance system.

Accordingly, the present invention provides illuminated trim for application to the vehicle door and/or door window frame of a motor vehicle. In its simplest embodiment, reflective tape is applied to the upper and front portions of the interior of a window frame or door flange such that the portions of the door window frame become reflective of other vehicle headlights when the door is either opened or closed with the window either up or down. The tape may be easily applied as an inexpensive after market item that enhances safety in darkness. It is visible on both the outside of the vehicle door and the inside of the vehicle door. Alternatively, the tape can be concealed by the door frame when the vehicle door is closed.

In another embodiment, the "tape" is embedded with one or more electrically powered lighting such as LEDs (light emitting diodes) or ELPs (electroluminescent panels). Since most vehicle doors already are powered for electric windows or mirrors, it is easy to connect an electrically powered door flange and/or window frame lighting. In still another embodiment, electrically powered lighting is built into the door flange and/or window frame door at the factory. In this embodiment, the LED lights are incorporated into or otherwise affixed to the gasket for the door window frame and/or door flange gasket.

The common denominator is that the door flange and/or window frame of a vehicle door is now more visible in the dark or fog on both the outside and the inside of the door. The LEDs can also be connected to the car's electrical system so that they illuminate to provide various signals, such as illuminating to correspond to the hazard lights, directionals, or other interior or exterior lights. Thus, when the vehicle door is opened, the luminant window frame and/or luminant door flange can be seen by traffic approaching towards the front of the vehicle and the rear of the vehicle.

Another embodiment for cars with convertible tops places illuminated trim on the A-pillar and on the edge of the convertible top.

The foregoing and related objects are readily attained according to the present invention by the provision of a motor vehicle window, comprising a window frame for receipt of a window therein and a luminant component which, when illuminated, can be seen in the dark wherein said luminant component is applied to at least a portion of said window frame so that it is visible through said window. Preferably, the luminant component is a reflective adhesive strip. Furthermore, it is optional that the luminant component further comprises means for lighting the luminant component.

Desirably, the window frame is provided on a door of a motor vehicle and the luminant component is visible on both the inside and the outside of the door. Furthermore, it is advantageous that the window frame has a top portion and the luminant component is mounted on the top portion of the window frame. It is also desirable that the window is a retractable window, moveable between an open and a closed position, and wherein the luminant component is visible when the window is open and when the window is closed. Advantageously, the window frame also has a front portion and the luminant component extends along the top portion of the window frame and down the front portion of the window frame. Optionally, the means for lighting said luminant component comprises electrically powered intermittent lights.

Moreover, the foregoing and related objects are also readily attained according to the present invention by the provision of a motor vehicle, comprising a window having a periphery; and luminant material arranged around at least a portion of the periphery of the window. In a further preferred embodiment, the motor vehicle is a car with a convertible top having an edge and an A-pillar and said luminant material is placed on the A-pillar and at least a portion of the edge of the convertible top.

Accordingly, certain of the foregoing and related objects are also readily attained according to the present invention by the provision of a method for illuminating a motor vehicle in the dark, comprising the steps of providing a motor vehicle having a window frame for receipt of a window therein; providing a luminant component which, when illuminated, can be seen in the dark and, attaching the luminant component to the window frame so that it is visible through the window. Preferably, the luminant component is a reflective adhesive strip and/or the luminant component further comprises means for lighting the luminant component.

Advantageously, the window frame is provided on a door of a motor vehicle and the luminant component is visible on both the inside and the outside of the door. In a preferred embodiment, the window frame has a top portion and the luminant component is mounted on the top portion of the window frame. It is also preferable that the window is a retractable window, moveable between an open and a closed position, wherein the luminant component is visible when the window is open and when the window is closed. Furthermore, it is preferable that the window frame also has a front portion and the luminant component extends along the top portion of the window frame and down the front portion of the window frame. In an additional preferred embodiment, the window frame includes the motor vehicle A-pillar and the lower edge of a convertible top. Optionally, said means for lighting said luminant component comprises electrically powered intermittent lights.

Additionally, the foregoing and related objects are also readily attained according to the present invention by the provision of a motor vehicle window, comprising a window frame provided on a door of a motor vehicle, having a top portion which is U-shaped, said top portion having an outer lip and an inner lip which are connected by a base wall and define a channel therebetween for receipt of a window therein, said inner and outer lips each having an inner and outer face; and a luminant component comprising one or a plurality of electrically powered lights which, when illuminated, can be seen in the dark; wherein said luminant component is attached to at least a portion of said outer face of said inner lip, so that said luminant component emits light through said window on the outside of the door.

Preferably, said window is a retractable window, moveable between an open and a closed position, and wherein said luminant component is visible when the window is open and when the window is closed. In another preferred embodiment, said window frame also has a front portion; and said luminant component extends along said top portion of said window frame and down said front portion of said window frame. Desirably, said one or more electrically powered lights are intermittent. In one embodiment, said one or more electrically powered lights are colored.

In another preferred embodiment, the invention includes a gasket which overlies said inner face of said outer lip, said base wall of said channel, and said inner and outer faces of said inner lip and said luminant component is attached to said gasket on at least a portion of said outer face of said inner lip. Preferably, said one or more lights are applied to overlie said gasket.

In another embodiment, the invention further includes an elongated tubular sealing element extending downwardly from said inner lip of said top portion of said window frame and having an inner face and an outer face and said luminant component is attached to at least a portion of said outer face of said tubular sealing element. Preferably, said one or more lights are applied to overlie said tubular sealing element. Alternatively, said lights are embedded in said tubular sealing element. Most desirably, the invention includes means for connecting said lights to an electrical system of a vehicle. Advantageously, the invention further comprises a flexible, elastomeric strip, wherein said plurality of light are attached to said elastomeric strip.

The objects of the invention are also attained by the provision of a method for illuminating a motor vehicle in the dark, comprising the steps of providing a motor vehicle having a door with a window frame for receipt of a window therein, said window frame having a top portion which is U-shaped, said top portion having an outer lip and an inner lip which are connected by a base wall and define a channel therebetween for receipt of the window therein, said inner and outer lips each having an inner and outer face; providing a luminant component comprising at least one or a plurality of electrically powered lights which, when illuminated, can be seen in the dark; attaching said luminant component to said window frame so that said luminant component is attached to at least a portion of said outer face of said inner lip, so that said luminant component emits light through said window on the outside of the door.

Desirably, the method further comprises the step of providing means for connecting said one or more lights to an electrical system of a vehicle and connecting said lights to said electrical system.

In one embodiment, said window frame also has a front portion; and said luminant component extends along said top portion of said window frame and down said front portion of said window frame. In another embodiment, said window frame includes a motor vehicle A-pillar and a lower edge of a convertible top.

Preferably, a window frame provided on a door of a motor vehicle, having a top portion which is U-shaped, said top portion having an outer lip and an inner lip which are connected by a base wall and define a channel therebetween for receipt of a window therein, said inner and outer lips each having an inner and outer face; and a luminant component comprising one or a plurality of electrically powered lights which, when illuminated, can be seen in the dark; wherein said luminant component is attached to at least a portion of said outer face of said inner lip, so that said luminant component emits light through said window on the outside of the door; and a gasket which overlies said inner face of said outer lip, said base wall of said channel, and said inner and outer faces of said inner lip and said luminant component is attached to said gasket on at least a portion of said outer face of said inner lip. Desirably, the window further comprises means for connecting said lights to an electrical system of the vehicle.

In a preferred embodiment, the window includes an elongated tubular sealing element extending downwardly from said inner lip of said top portion of said window frame and having an inner face and an outer face and said luminant component is attached to at least a portion of said outer face of said tubular sealing element. Advantageously, said lights are applied to overlie said gasket.

In another embodiment, said window further comprises a tinted window portion wherein said window is darkened with window tinting; and at least one untinted window portion overlying at least one of said lights, to permit said at least one light to emit light through said window on the outside of the door. Preferably, said window has a top edge and an upper edge portion disposed adjacent said top edge and wherein said untinted portion is disposed on said upper edge portion. More preferably, said untinted portion comprises a plurality of portions of said window overlying each of said lights.

Certain of the foregoing and related objects are also readily attained according to the provision of a motor vehicle window, comprising a window frame provided on a door of a motor vehicle, having a top portion which is U-shaped, said top portion having an outer lip and an inner lip which are connected by a base wall and define a channel therebetween for receipt of a window therein, said inner and outer lips each having an inner and outer face; and a luminant component which, when illuminated, can be seen in the dark; wherein said luminant component is applied to overlie at least a portion of said inner face of said inner lip, so that said luminant component reflects light on the inside of the door. Preferably, said luminant component is a member selected from the group consisting of a reflective adhesive strip and a reflective paint. Advantageously, said window is a retractable window, moveable between an open and a closed position, and wherein said luminant component is visible when the window is open and when the window is closed. More preferably, the window further comprises a gasket which overlies said inner face of said outer lip, said base wall of said channel, and said inner and outer faces of said inner lip and said luminant component is applied to overlie said gasket on at least a portion of said inner face of said inner lip. Desirably, said window further comprises an elongated tubular sealing element extending downwardly from said inner lip of said top portion of said window frame and having an inner face and an outer face and said luminant component overlies at least a portion of said inner face of said tubular sealing element.

Additionally, certain of the foregoing and related objects are also readily attained according to the provision of an illuminatable motor vehicle door, comprising a door of a motor vehicle, having an upper edge, a lower edge, an outer side edge, and an opposite inner side edge, wherein said inner and outer side edges each have a lower edge portion and wherein a lower door flange is defined on said door generally adjacent to said lower edge and between said lower edge portions of said inner and outer side edges; and a luminant component which, when illuminated, can be seen in the dark; wherein said luminant component is applied to overlie at least a portion of said lower door flange of said door of said motor vehicle, so that said luminant component reflects light on the inside of the door.

Preferably, said luminant component is visible when said door is opened and is concealed when said door is closed.

Desirably, said luminant component further comprises means for lighting said luminant component.

Advantageously, said luminant component is a member selected from the group consisting of a reflective adhesive strip and a reflective paint. It is also preferable that said luminant component is spaced apart from said lower edge of said door. In a preferred embodiment, said luminant component extends substantially the entire length of said lower edge of said door.

In another preferred embodiment, the motor vehicle door further comprises a gasket which overlies a portion of said lower door flange, and wherein said luminant component is applied to overlie said gasket. Preferably, said luminant component is applied to overlie said gasket and said lower door flange. Desirably, said gasket comprises a straight portion which extends generally parallel with said lower edge of said door and a curved end portion disposed generally adjacent to said outer side edge of said door, which curves upwardly towards said upper edge of said door. Preferably, said luminant component extends generally horizontally and generally parallel to said lower edge of said door.

Furthermore, certain of the foregoing and related objects of the invention are also readily attained by the provision of a motor vehicle door assembly, comprising a motor vehicle door frame; a motor vehicle door which is hingeably connected to said motor vehicle door frame and configured and dimensioned to releasably engage with said motor vehicle door frame; and a luminant component applied to overlie at least a portion of said motor vehicle door frame, so that said luminant component reflects light outwardly from said motor vehicle door frame.

In the preferred embodiment, said motor vehicle door frame comprises a lower door frame portion, a forward door frame portion, an upper door frame portion, and a rear door frame portion, which collectively define an opening therebetween. In one embodiment, said luminant component is applied to overlie at least a portion of said forward door frame portion. In another embodiment, said luminant component is applied to overlie at least a portion of said forward door frame portion and at least a portion of said upper door frame portion. In yet another embodiment, said luminant component is applied to overlie at least a portion of said upper door frame portion.

Preferably, said luminant component is arranged on said motor vehicle door frame such that said luminant component is visible when said motor vehicle door is open and is concealed when said motor vehicle door is closed. Advantageously, said luminant component further comprises means for lighting said luminant component. Desirably, said luminant component is at least one reflective adhesive strip. In the alternative, said luminant component is reflective paint.

In a preferred embodiment, said luminant component comprises a plurality of spaced apart luminant components applied to overlie at least a portion of said motor vehicle door frame. Preferably, said luminant component extends substantially the entire length of said forward door frame portion of said motor vehicle door frame. Desirably, said luminant component extends substantially the entire length of said forward door frame portion and said upper door frame portion of said motor vehicle door frame. Advantageously, said luminant component extends substantially the entire length of said upper door frame portion of said motor vehicle door frame.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 2:
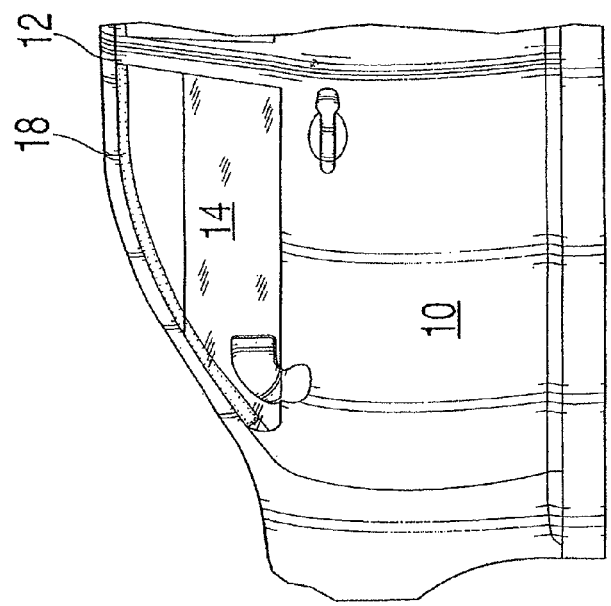
FIG. 2 is a broken side elevation view of the exterior of a vehicle door similar to that shown in FIG. 1, but with the window partially down.
Figure 1:
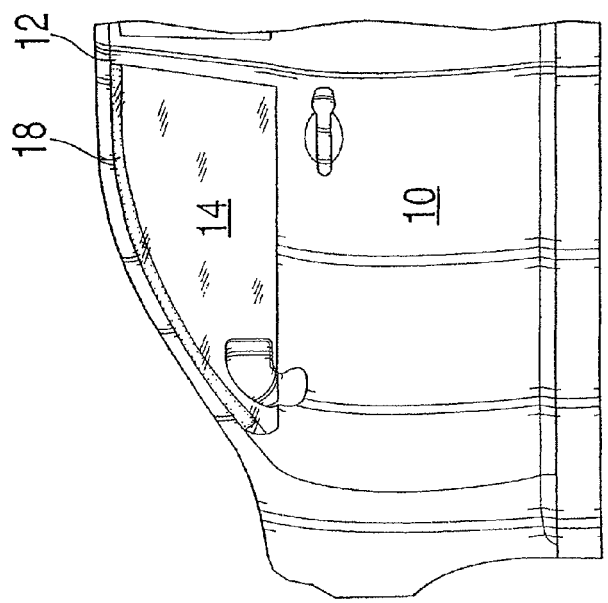
FIG. 1 is a broken side elevation view of the exterior of a vehicle door incorporating the invention with the window up.

Referring to the figures generally, therein illustrated is a conventional motor vehicle door 10 of the type having a window opening and a window frame generally surrounding the window opening to which the luminant or luminous component or trim 18 of the present invention has been added. In the embodiments of FIGS. 1-7, the window frame is defined along its top end by an upper window frame 12 which engages a conventional retractable window 14. The retractable window 14 is moveable between a closed position, as seen in FIG. 1, wherein the top edge of the window 14 engages with the upper window frame 12, and open positions wherein the window 14 is partially or fully retracted into the body of the door 10. FIG. 2 illustrates the window 14 in a partially open position, wherein a portion of the window 14 is received within the body of the door 10. However, it can be appreciated that the window 14 is moveable from a fully closed position to a fully open position, and any position therebetween.

A luminous or luminant component 18 is applied to at least a portion of the outer side of the upper window frame 12, so that it is visible from outside of the vehicle, through the window 14, when the door is closed and the window 14 is in its closed position, as seen in FIG. 1. As seen in FIG. 2, in one embodiment, the luminant component 18 is also visible from outside the car when the window 14 is in an open position and the door 10 is closed. The placement and configuration of the luminant component 18 serves as a safety feature for the vehicle, such as at night because headlights from an oncoming vehicle would illuminate the luminant component, whether the window is up or down, and make the closed door 10 and, in turn, the vehicle more visible to another driver. This is even more useful if a vehicle is parked or does not have its headlights, taillights or interior lights on. Therefore, the luminant component 18 serves as a safety feature even without the vehicle being turned on, such as if a vehicle is parked or breaks down.

Figure 4:
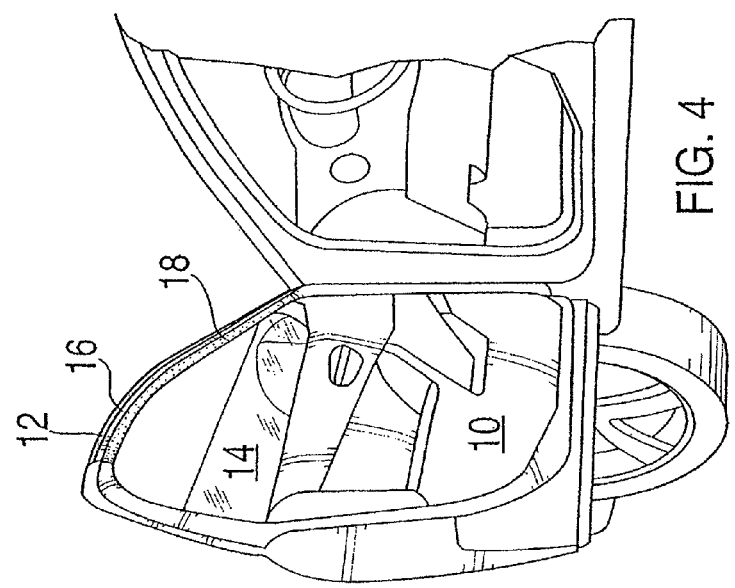
FIG. 4 is a broken perspective view of the interior of a vehicle door similar to that shown in FIG. 3, but with the window partially down.
Figure 3:
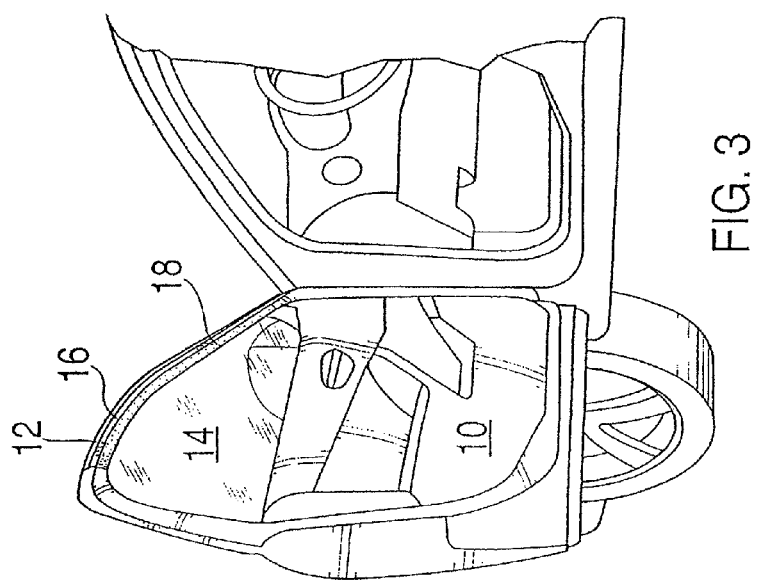
FIG. 3 is a broken perspective view of the interior of a vehicle door incorporating the invention with the window up.

Additionally, in one embodiment, the luminant component 18 is applied to at least a portion of the inner side of the upper window frame 12 so that it is visible when the vehicle door 10 is open, as seen in FIGS. 3 and 4. The luminant component 18 is visible when the door 10 is open, both when the window 14 is in a closed position, as in FIG. 3, and in an open position, as in FIG. 4. Accordingly, in this embodiment, the placement and configuration of the luminant component 18 is also a safety feature for a vehicle when the door 10 is open, such as if a vehicle is parked and passengers are entering or exiting the vehicle. It also aids in protecting the vehicle and passengers should a vehicle break down on the side of the road, because headlights from other vehicles would illuminate the luminant component 18 in the open door, which may not otherwise be visible by trailing traffic approaching from behind the vehicle.

Figure 5:
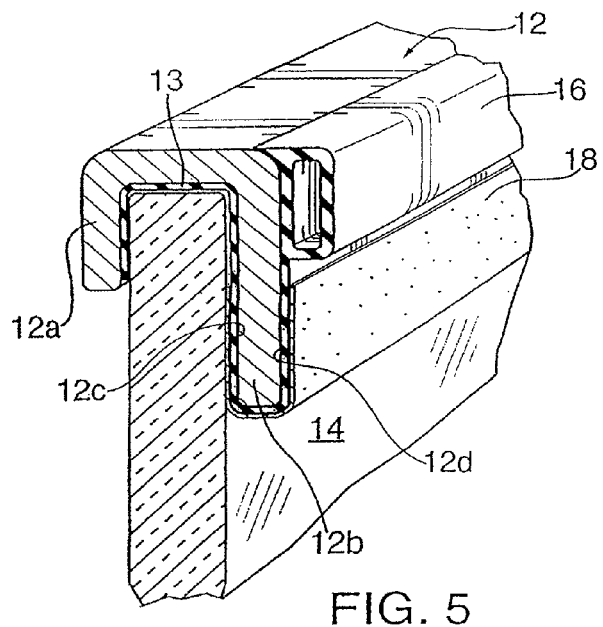
FIG. 5 is an enlarged broken cross sectional view of a "J-shaped" vehicle window frame incorporating the invention with the window up.
Figure 6:
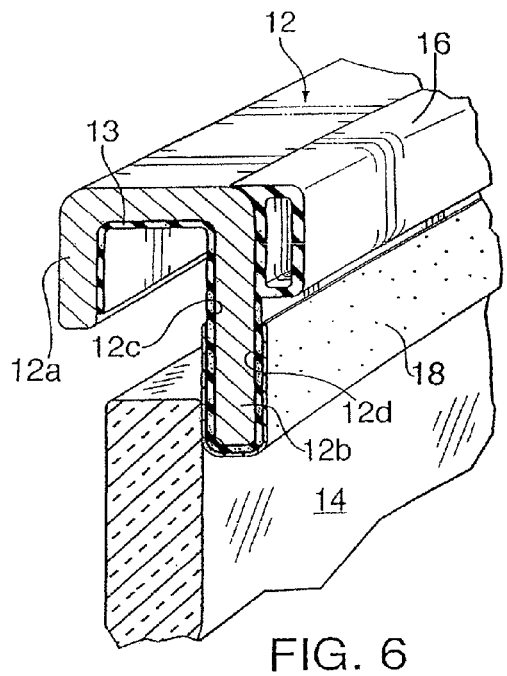
FIG. 6 is an enlarged broken cross sectional view of a "J-shaped" vehicle window frame similar to that shown in FIG. 5, but with the window partially down.

More particularly, as seen in FIGS. 5 and 6, a conventional upper window frame 12, typically made of metal, is U-shaped and has an outer lip 12a and an inner lip 12b, which define a channel therebetween which defines the upper limit of movement of the window 14. However, the exact configuration of upper window frame 12 may vary depending on the make and model of the vehicle. When the window 14 is in the closed position, as seen in FIG. 5, the top edge of the window 14 is snugly received within the channel and abuts the base wall of window frame 12. The inner lip 12b has an outer face 12c and an inner face 12d. An elastomeric (preferably rubber) gasket 13 extends along the inside of the frame and up onto at least a portion of the inner face 12d, and, preferably up to the top surface thereof (as shown). The gasket 13 also includes a deformable, elongated tubular sealing element 16 which is provided on the inner face 12d of the upper window frame 12, preferably on the top surface thereof, as shown in FIGS. 5 and 6. Sealing element 16 both seals and cushions the top of the car door 10 when it is closed.

According to the invention, in one embodiment, a luminant component 18 is applied to both the outer face 12c and the inner face 12d of the inner lip 12b of the window frame 12. It is not necessary to extend the luminant component 18 on the outer face 12c any higher than the lower edge of the outer lip 12a since it would be shielded by the outer lip 12a. The luminant component 18 may be attached to the upper window frame 12 by use of an adhesive, but other suitable methods to affix it may be utilized. However, luminant component 18 may be applied only to outer face 12c or only to inner face 12d.

The illustrated embodiment of FIGS. 5 and 6 shows the luminant component 18 to be a reflective tape that is applied to both the outer face 12c and the inner face 12d of the inner lip 12b of the upper window frame 12. However, luminant component 18 may be applied only to outer face 12c or only to inner face 12d. Preferably, the reflective trim is provided in the form of a reflective tape that has an adhesive applied to its underside which is normally covered by a release ply or strip (not shown), the latter of which is removed when the tape is applied to the window frame 12. This is an easy to install after market improvement which is also relatively inexpensive. However, it can be appreciated that the luminant component can be applied when manufacturing the window frame 12.

As can be seen in FIG. 5, the window 14 overlies the luminant component 18 which is applied to the outer face 12c of upper window frame 12, so that the luminant component 18 is visible through window 14 when it is in a closed position. Accordingly, as seen in FIGS. 1-2 and 5-7, the luminant component 18 is visible through the window 14, so that it is visible from outside the vehicle at all times, whether the window is in an open position as in FIGS. 2 and 6-7 or in a closed position, as in FIGS. 1 and 5. This arrangement serves to protect the luminant component 18 from the weather so that it lasts longer, as compared to applying it to the exterior of the vehicle. This window shielding also cuts down on degradation of the reflective trim caused by ultraviolet (UV) radiation.

Figure 7:
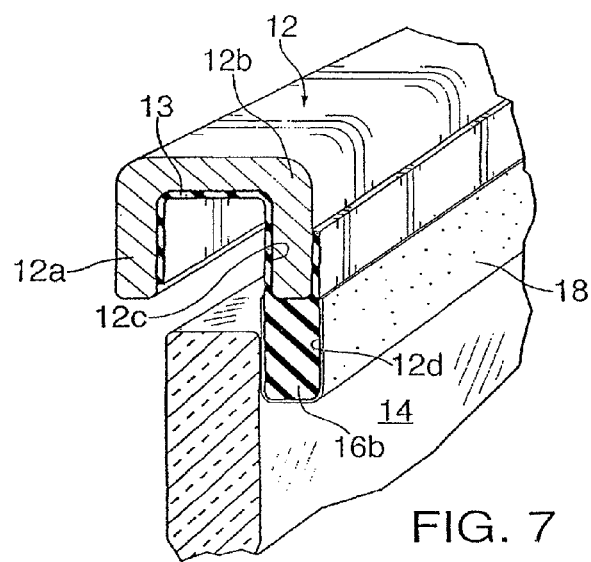
FIG. 7 is an enlarged view similar to FIG. 6 but with a "U-shaped" window frame.

Since in one embodiment the luminant component 18 can also be applied to the inner face 12d of the upper window frame 12, the luminant component 18 is also visible from the inside of the vehicle when the door is open, as seen in FIGS. 3-4 and 5-7, whether the window is closed as in FIGS. 3 and 5, or in an open position, as in FIGS. 4 and 6-7. As mentioned above, this serves to protect the vehicle and make it more visible when the door is open.

Figure 9:
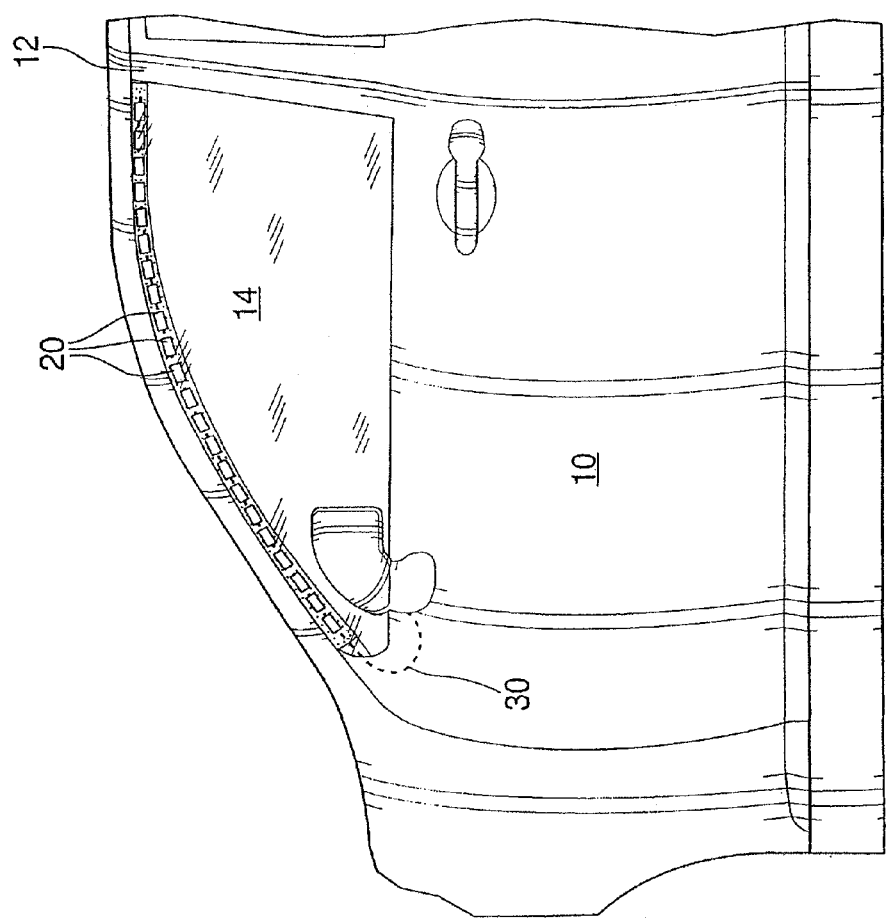
FIG. 9 is a broken side elevational view of the exterior of a vehicle door incorporating a luminant component having a plurality of lights.

According to another embodiment of the invention, the luminant component 18 may also be a reflective paint. Various reflective paints are well known to those having ordinary skill in the art. Furthermore, according to other embodiments of the invention, the luminant component 18 may also be electrically powered and illuminated from a source of light, rather than, or in combination with the reflective trim 18. For example, the luminant component 18 can be one or more LED lights 20, one or more ELPs, illuminated fiber optics or the like, as seen in FIG. 9. Furthermore, the luminant component 18 may include flashing or intermittent lights in any variety of colors or patterns. The electrically powered luminant component may be installed at the factory when the vehicle is being manufactured or may be added as an after market accessory.

More particularly, as seen in FIGS. 9-12, in another embodiment, the luminant component 18 preferably comprises a plurality of lights 20 which are affixed to or otherwise connected to upper window frame 12, so that lights 20 are visible through window 14 when it is both open and closed. Particularly, in one preferred embodiment lights 20 and the electrical connections therebetween are attached to a flexible, preferably elastomeric, strip 21, such as the Glass Gloz LED made Marklyn Group Inc. of Brampton, Ontario, Canada, Techno Lite manufactured by Pilot Automotive of City of Industry, CA, or LED Flexi-Lite manufactured by Pilot Automotive, which are incorporated herein by reference.

Figure 10:
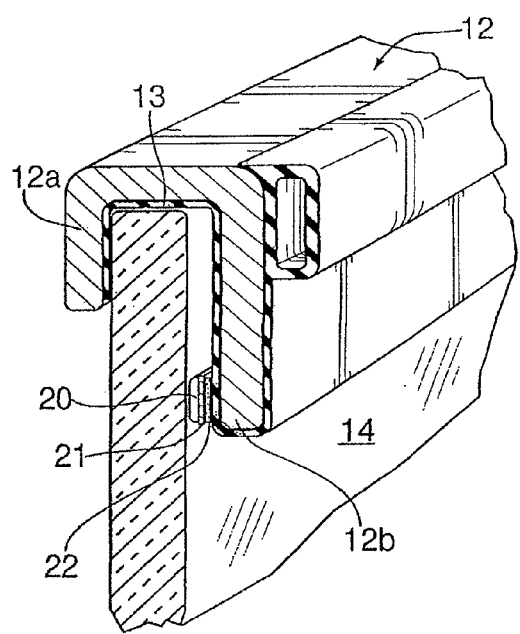
FIG. 10 is an enlarged broken cross-sectional view of the vehicle window frame incorporating a luminant component having a plurality of lights overlying the gasket.

As seen in FIGS. 9-10, strip 21 and lights 20 are connected to upper window frame 12. In one preferred embodiment, as seen in FIG. 10, a plurality of lights 20 are affixed to inner lip 12b of upper window frame 12, so that lights 20 are visible through window 14. Preferably, lights 20 and the electrical connections therebetween are applied to overlie gasket 13. Particularly, strip 21 can be affixed to gasket 13 or window frame 12 by adhesive 22 or other suitable means of attachment. In another preferred embodiment, a portion of gasket 13 is removed to accommodate the strip 21 of lights 20.

Alternatively, in another embodiment, one or more lights 20 and the electrical connections therebetween can be embedded into or otherwise incorporated into gasket 13. However, any suitable methods of attachment of lights 20 to upper window frame 12 would be well known to persons having ordinary skill in the art, since the structure of the window frame 12 varies by car manufacturer or model. One or more lights 20 can be connected to any portion of window frame 12 and/or gasket 13 such that the light(s) are visible through the window on the exterior of the car.

Additionally, light(s) 20 include means for connecting the light(s) 20 to the car's electrical system such as through wire 30. For example, as seen in FIG. 9, lights 20 can be connected via wire 30 to an electrical connection in the side view mirrors. The wiring schematics of the car's electrical system are well known to those having ordinary skill in the art and it would be well known how to electrically connect lights 20 to various components of the car's electrical system. However, any method of providing power to light(s) 20 can be utilized such as, for example, battery power such as 12V battery or solar power.

Moreover, lights 20 can be various colors or illuminate in various flash patterns such as strobbing, in series, or any other flash pattern to provide a desired signal. Additionally, lights 20 can be electrically connected to various components of the car to illuminate and provide a desired signal. More particularly, lights 20 can be incorporated into both the driver and the passenger window frames 12 and connect to the directional signals such that when the driver uses the right turn signal, the lights 20 on the right passenger side door are illuminated. Similarly, when the driver uses the left turn signal, the lights 20 on the left driver side door are illuminated.

The lights 20 can be electrically connected to the vehicle's hazard signals and illuminate when the headlights and taillights illuminate when displaying the hazard signal. Furthermore, the lights 20 can be connected to the interior lights of the car and illuminate when the interior lights are illuminated, such as when a door is opened. The lights 20 can also be connected to other lighting systems such as door lights and door handle lights to illuminate when those corresponding lights illuminate.

While several embodiments of connections to various lights and components of the car's electrical system have been described as examples, lights 20 can be connected to any component of the car's electrical system to provide a desired signal. It would be well known to one having ordinary skill in the art how to electrically connect lights 20 to the various components in the car's electrical system. Moreover, the lights 20 can have their own switch (not shown) to illuminate them as desired. The switch can, for example, have means to control which lights are illuminated, the color of light emitted or the flashing pattern of the lights 20.

FIG. 7 shows an alternate embodiment of the invention where the upper window frame 12 is U-shaped, rather than the J-shaped frame of FIGS. 5 and 6. In this case, the inner lip 12b is provided with a downwardly extending extension 16b provided via an enlargement of the gasket 16 which, in effect, turns the U-shaped channel into a J-shaped channel, comparable to that shown in FIGS. 5 and 6. The extension 16b extends below the lower edge of the outer lip 12a so that the luminant component 18 can be affixed to both sides of the extension 16b, at which position where it is not shielded by the outer lip 12a. Accordingly, as with the embodiment shown in FIGS. 5-6, since the luminant component 18 is applied to both sides of extension 16b, it is visible when the door is closed and the window is open or closed as well as when the door is open, and the window is either open or closed.

Figure 11:
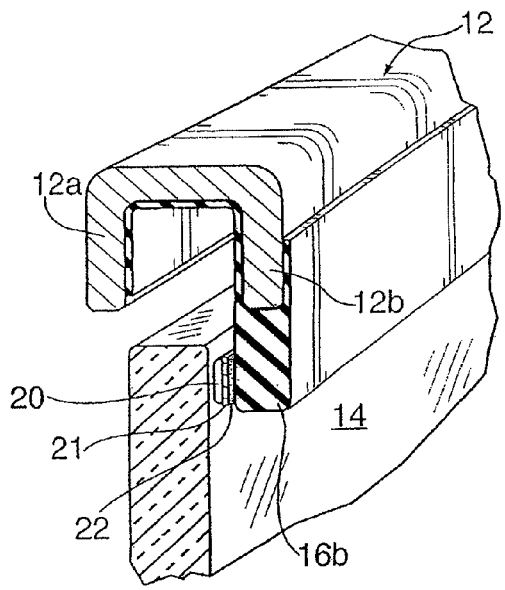
FIG. 11 is an enlarged broken cross-sectional view of the vehicle window frame incorporating a luminant component having a plurality of lights applied to the tubular sealing element.

In a preferred embodiment, lights 20 are affixed to extension 16b. In one embodiment as seen in FIG. 11, lights 20 overlie extension 16b, so that lights 20 are visible through window 14. Particularly, strip 21 incorporating lights 20 and the electrical connections therebetween are attached to extension 16b by adhesive 22. However, other suitable methods of attachment would be well known to a person having ordinary skill in the art. In another embodiment, a portion of extension 16b is removed to accommodate the strip 21 of lights 20.

Figure 12:
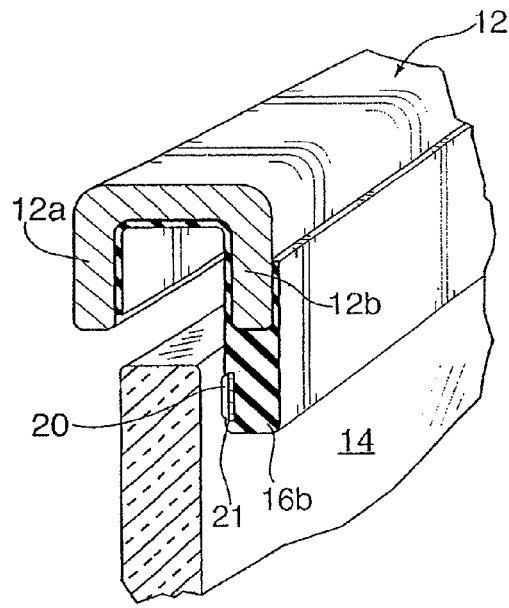
FIG. 12 is an enlarged view similar to FIG. 11, but illustrating the lights embedded in the tubular sealing element.

Alternatively, as seen in FIG. 12, lights 20 and the electrical connections therebetween can be embedded or otherwise incorporated into extension 16b so that lights 20 are visible through the window. Alternatively, a portion of extension 16b can be removed to accommodated strip 21 and lights 20. However, lights 20 can be attached to extension 16b in any manner in which they are visible through the window on the exterior of the car, as the exact configuration of window frame 12 varies by make and model of the car.

Figure 8:
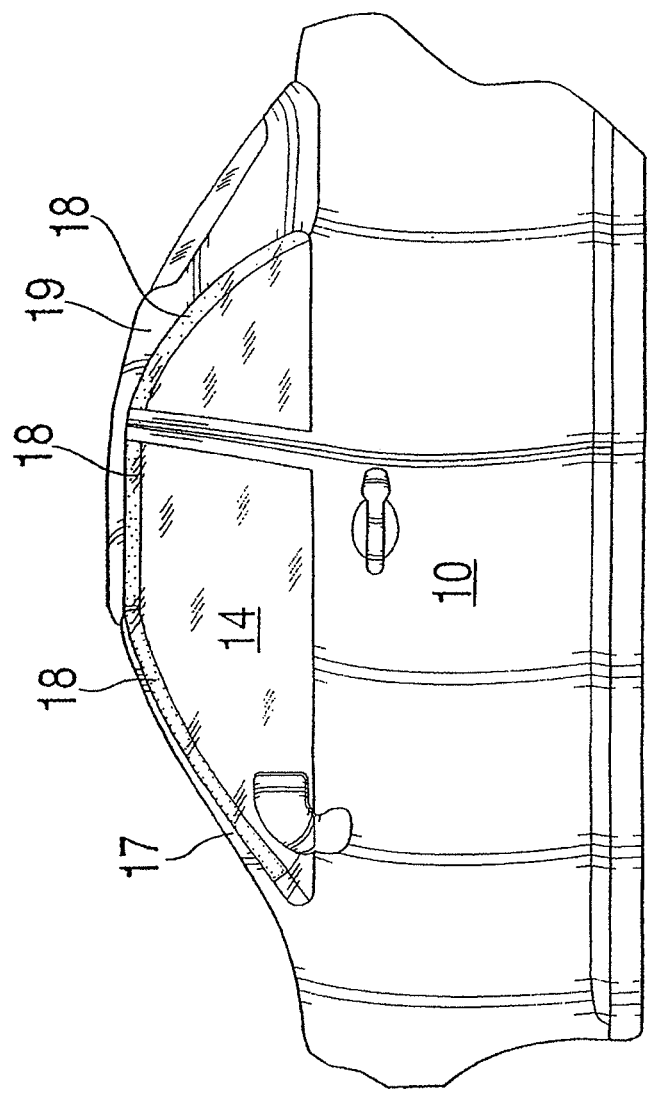
FIG. 8 is an enlarged view similar to FIGS. 1 and 2, but illustrating a car with a convertible top.

FIG. 8 shows an embodiment designed for a conventional convertible car having a removable, collapsible and/or retractable convertible top 19. The vehicle top has a gasket extending along its lower edge which engages the retractable windows 14 when the windows is in a closed position, and the top is up.

In this embodiment, the luminant component 18 is affixed to the A-pillar 17 (adjacent the front windshield) of the vehicle as shown on the left of FIG. 8 and on the gasket disposed on the lower edge of the convertible top 19, as shown in the middle and right of FIG. 8 (adjacent the top of the front side window and along the curved side of the rear side window). As seen in FIG. 8, the luminant component 18 is visible through the window 14, when the window is closed and the top is up. The luminant component 18 is also visible when the window is in an open position (not shown). Furthermore, since the luminant component is affixed to the A-pillar 17, it is also visible when the convertible top 19 is down (not shown).

Figure 13A:
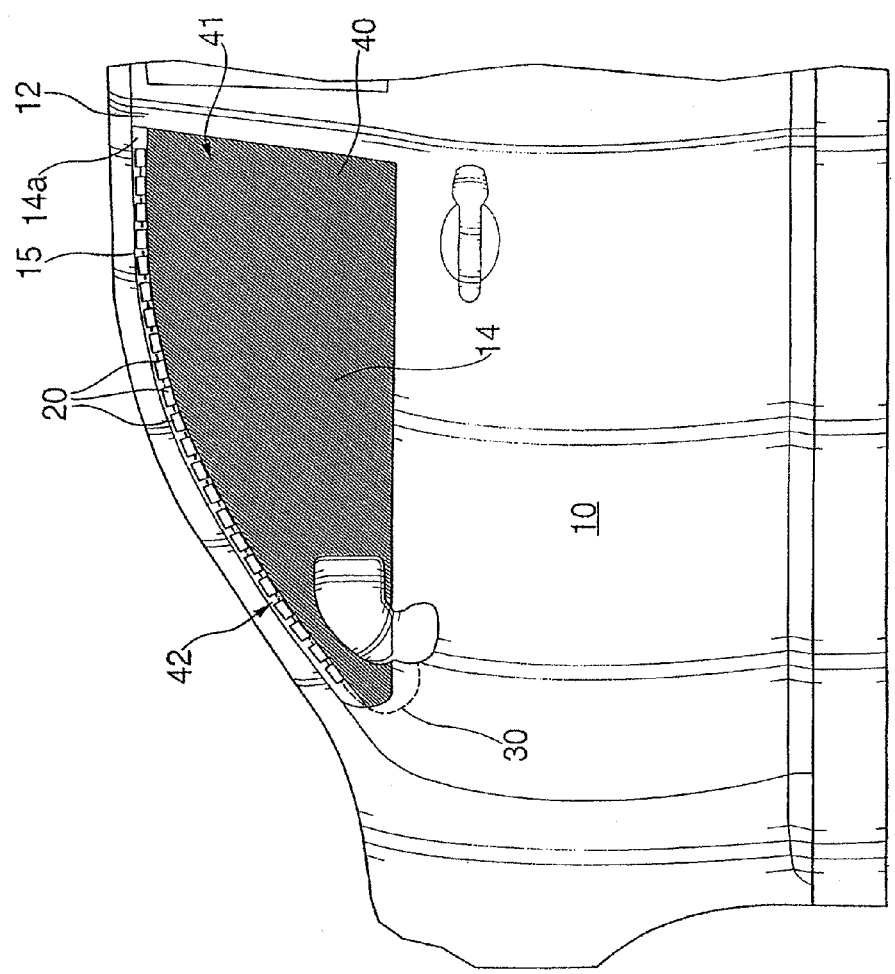
FIG. 13a is a view similar to FIG. 9, but illustrating a tinted window without tinting along an entire upper edge section of the window.
Figure 13B:
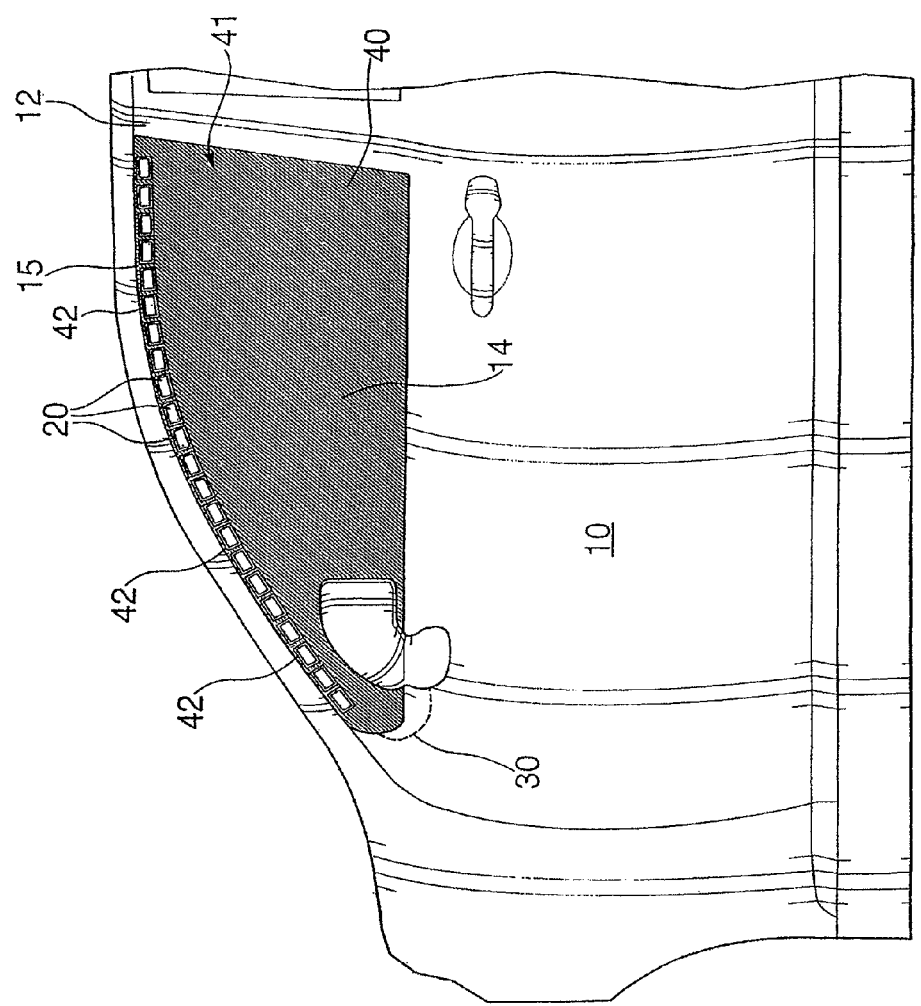
FIG. 13b is a view similar to FIG. 13a, but illustrating a tinted window without tinting on a plurality of portions of the window overlying each of the lights.

Furthermore, certain windows 14 include darkening window tinting 40, as seen in FIGS. 13a and 13b. Conventional darkening window tinting is well known to those having ordinary skill in the art. However, darkening window tinting 40 which overlies luminant component 18 may severely diminish the light emitted therefrom or even prevent the luminant component 18 from being visible through window 14. Therefore, it is desirable that a portion of the window 14 have at least one untinted portion 42 without the darkening window tinting 40, to allow the luminant component 18 to emit light through the window. The window 14 can be manufactured such that window tinting 40 does not overly the luminant component 18 in the untinted portion 42. Alternatively, the window tinting 40 may be removed from window 14 in the untinted portion 42. In another alternative embodiment, holes can be drilled or otherwise formed in window 14 in the untinted portions 42.

More particularly, as seen in FIGS. 13a and 13b, window 14 may include a tinted window portion 41 and at least one untinted window portion 42. Untinted window portion 42 allows the light emitted from the plurality of lights 20 to be emitted through the window 14 and seen on the outside of the vehicle. As seen in FIG. 13a, window 14 has an upper edge portion 14a which extends along the portion of the window adjacent top edge 15. As seen in FIG. 13a, upper edge portion 14a is the untinted portion 42 of window 14, which allows lights 20 to be seen and emitted on the outside of the vehicle. As shown best in FIG. 13a, the tinted portion 41 covers window 14 beneath the plurality of lights 20. In the alternative, as seen in FIG. 13b, untinted portions 42 are only the portions of the window 14 that overlie each of the plurality of lights 20. Particularly, as seen in FIG. 13b, untinted portion 42 comprises a plurality of portions which only overlie the lights 20. These portions 42 may be sections of the window without 14 tinting 42 or else the window 14 may be drilled or formed with holes in these portions.

Figure 14:
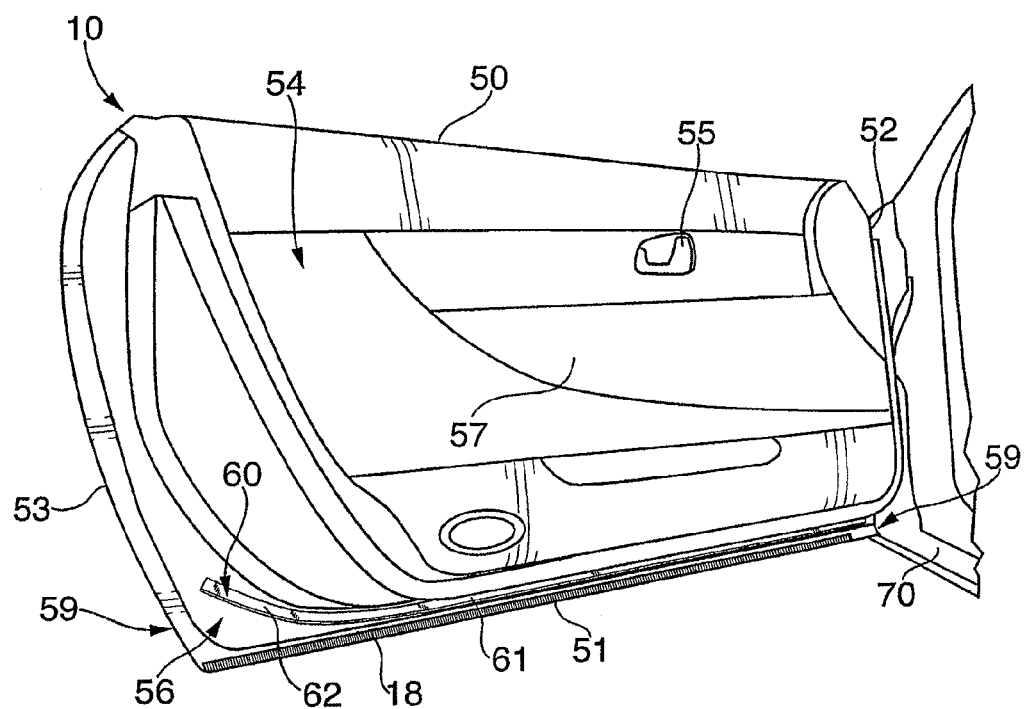
FIG. 14 is a broken perspective view of the vehicle door in its open position, incorporating a luminant component applied to a lower door flange of the door.
Figure 15:
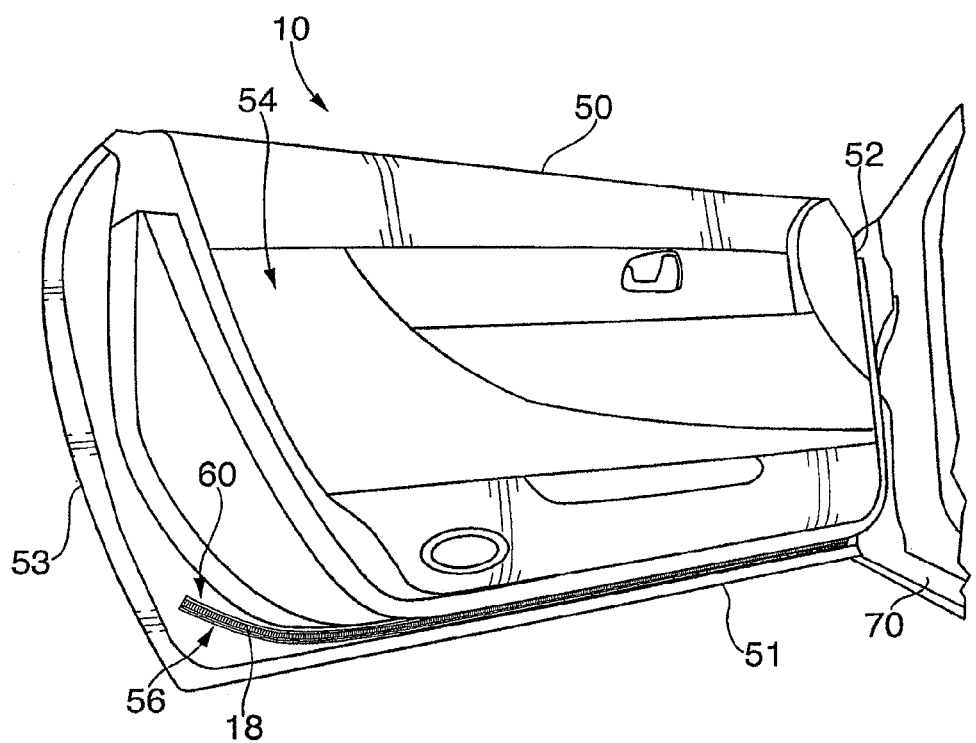
FIG. 15 is a view similar to FIG. 14, but with the luminant component applied to overlie a gasket on the lower door flange of the door.
Figure 16:
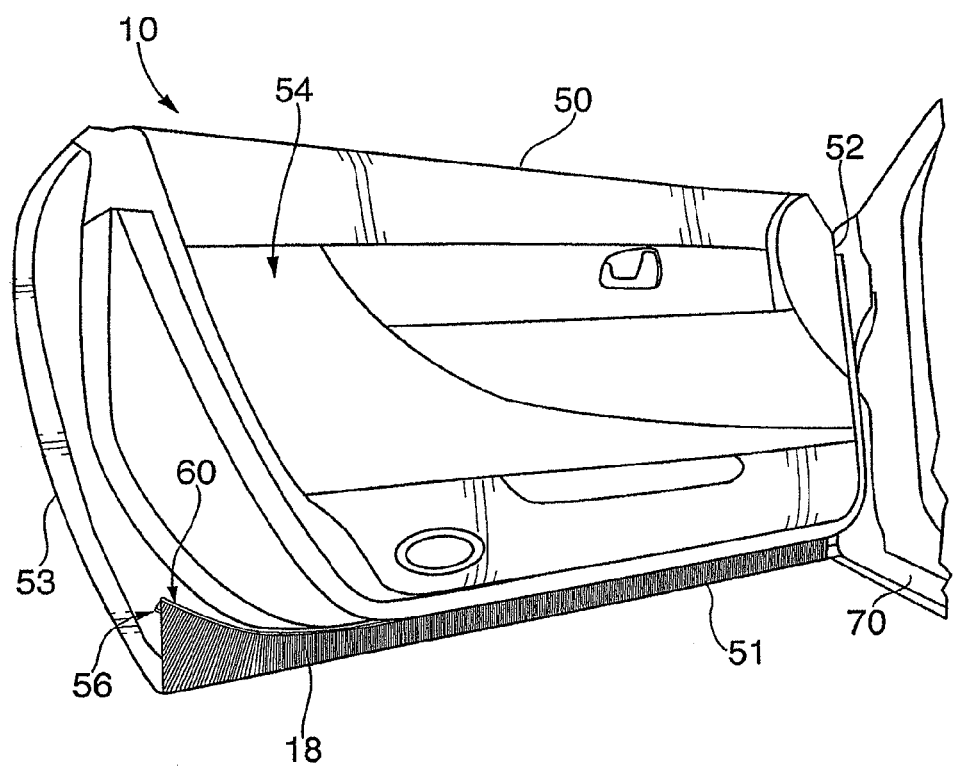
FIG. 16 is a view similar to FIG. 15, but with the luminant component overlying the gasket and lower door flange of the door.

In yet another embodiment of the present invention illustrated in FIGS. 14-16, the luminant component 18 is applied to the door 10 of the motor vehicle, such that the door 10 is illuminatable and becomes increasingly visible, once illuminated, to serve as a vehicle door vehicle accident avoidance system. Preferably, door 10 is the side door of a motor vehicle, however, application of luminant component 18 to other vehicle doors is possible. As seen best in FIG. 14, side door 10 of the motor vehicle is openable and closeable and has an upper edge 50, a lower edge 51, an inner side edge 52 connected to the vehicle door frame 70, and an opposite outer side edge 53. Although, door 10 is shown as a convertible type side door having its window retracted, door 10 can assume other configurations and such vehicle door arrangements would be well known to those having ordinary skill in the art.

As also shown in FIG. 14, the inner side edge 52 and the outer side edge 53, each have a lower edge portion 59 disposed on a portion of the respective edges adjacent to and above lower edge 51. A lower door flange 56 is defined on door 10 collectively between lower edge portion 59 of inner side edge 52, lower edge portion 59 of outer side edge 53, and lower edge 51. Typically, in most vehicles, the interior of the vehicle door 10 has an inwardly projecting console 54 disposed generally centrally on the door 10 and spaced above and apart from lower edge 51. Console 54 includes, among other features, a door handle 55 and an armrest 57. In the preferred embodiment shown in FIGS. 14-16, lower door flange 56 is defined on the portion of door 10 collectively between console 54, lower edge 51, and the lower edge portions 59 of inner and outer side edges 52 and 53. It can be appreciated that the exact shape and size of lower door flange 56 will vary depending on the make and model of the particular vehicle and arrangement of the vehicle door 10.

As seen in FIG. 14, door 10 also includes a luminant component 18 affixed to lower door flange 56 which, when illuminated, can be seen in the dark. As seen in FIGS. 14-16, luminant component 18 is applied to overlie at least a portion of lower door flange 56 of door 10, so that luminant component 18 reflects light on the inside of the door. The exact placement of luminant component 18 on lower door flange 56 may vary. Luminant component 18 can be a reflective adhesive strip which can be affixed to lower door flange 56 of door 10, for example, through adhesive means or luminant component 18 may be a reflective paint applied to lower door flange 56. The exact size and dimensions of luminant component 18 may vary. However, luminant component 18 may have other means of illumination, as described above. For example, luminant component 18 may further include means for lighting, such as electrically powered LED lights, as described above, and means for electrically connecting such lights to the vehicle's electrical system.

When door 10 is opened and luminant component 18 is illuminated, the door 10 of the vehicle has increased visibility. This is particularly useful to illuminate the door 10 when ajar, to traffic that is approaching from the rear of the vehicle, which headlights will illuminate the luminant component 18.

In the embodiment illustrated in FIG. 14, luminant component 18 is applied generally parallel and adjacent to lower edge 51 of door 10 and extends generally horizontally, and substantially the length of lower edge 51, between side edges 52 and 53. The horizontal placement of luminant component 18 is particularly desirable because a portion of luminant component 18 is still visible even if a person is standing in front of door 10, concealing a portion of luminant component 18. In comparison, an overall generally vertical placement of luminant component 18 is not desirable as a person may by standing in front of door 10, such as when exiting a vehicle, obscure the entire luminant component 18, thus eliminating any added safety luminant component 18 may provide. The exact placement of luminant component 18 on lower door flange 56 can vary and luminant component 18 can be, for example, affixed in a position which is spaced apart from lower edge 51 or luminant component 18 may extend only partially the length of lower edge 51.

As seen in FIGS. 14-16, door 10 further includes a gasket 60 which overlies a portion of lower door flange 56 and aids in sealing door 10 to the door frame 70. As shown in FIG. 15, gasket 60 is spaced apart from lower edge 51 of door 10, however, its exact shape, size, and placement on door 10 may vary. In the embodiment shown in FIGS. 14-16, gasket 60 comprises a straight portion 61 which extends generally horizontally and parallel with lower edge 51 and a curved end portion 62 disposed generally adjacent to outer side edge 53 of door 10, and which curves upwardly towards upper edge 50 of door 10.

As seen in FIG. 15, in a further embodiment of the present invention, luminant component 18 is applied to solely overlie gasket 60. Although, FIG. 15 illustrates luminant component 18 overlying substantially all of gasket 60, it can be appreciated that luminant component 18 may overlie only a portion of gasket 60. In yet another embodiment of the present invention, as shown in FIG. 16, luminant component 18 is applied to overlie gasket 60 and substantially the remainder of lower door flange 56, down to lower edge 51. It can be appreciated that the exact placement of luminant component 18 on both gasket 60 and lower door flange 56, may vary. In order to apply luminant component 18 to gasket 60, luminant component 18 can be heated in order to affix luminant component to gasket 60.

Preferably, luminant component 18 is visible when the door 10 is opened but is concealed by door frame 70 when the door 10 is closed. Particularly, it is preferable that the shape and placement of luminant component 18 mirrors the shape and arrangement of door frame 70, so that luminant component 18 overlies the portion of lower door flange 56, which is concealed by door frame 70, when the door is closed, so that luminant component 18 is also concealed when door 10 is closed. Therefore, luminant component 18 does not interfere with the driver's vision from inside of the vehicle or otherwise distract from the interior appearance of the vehicle, when door 10 is closed.

Figure 17:
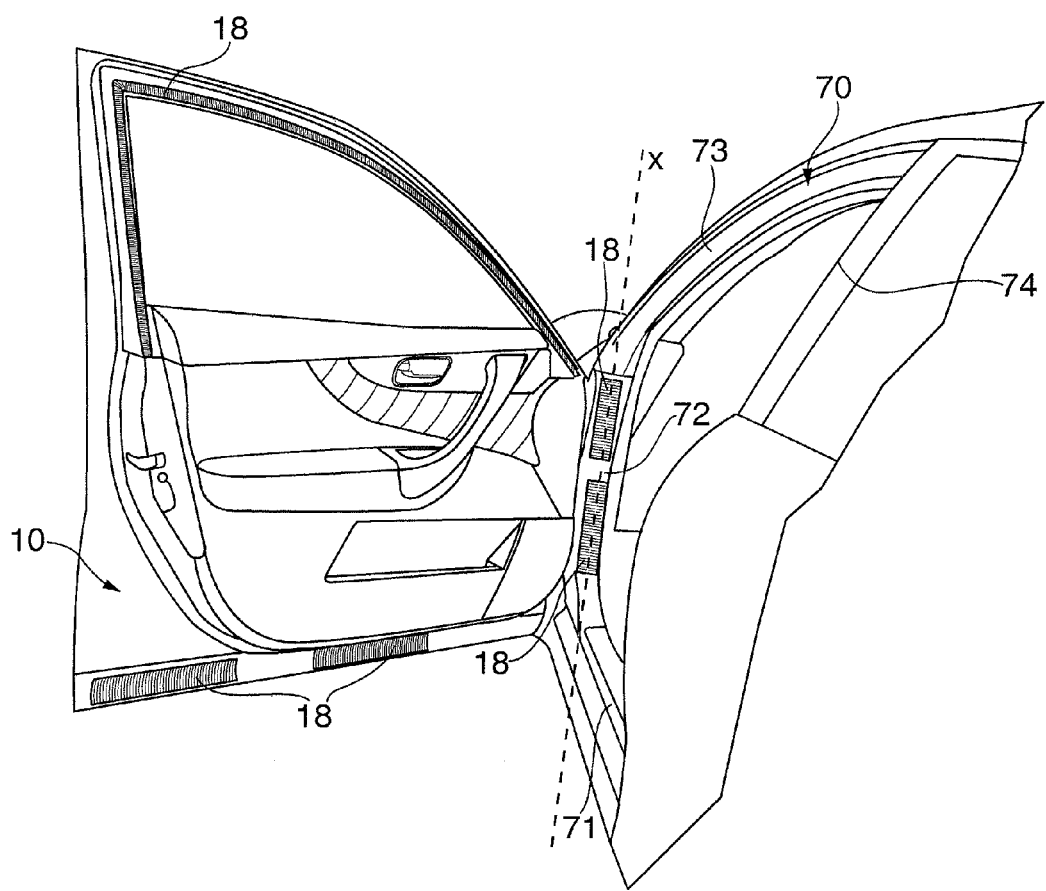
FIG. 17 is a broken perspective view of the vehicle door in its open position, with the luminant component applied to a portion of the vehicle door frame, lower door flange, and window frame of the vehicle.
Figure 18:
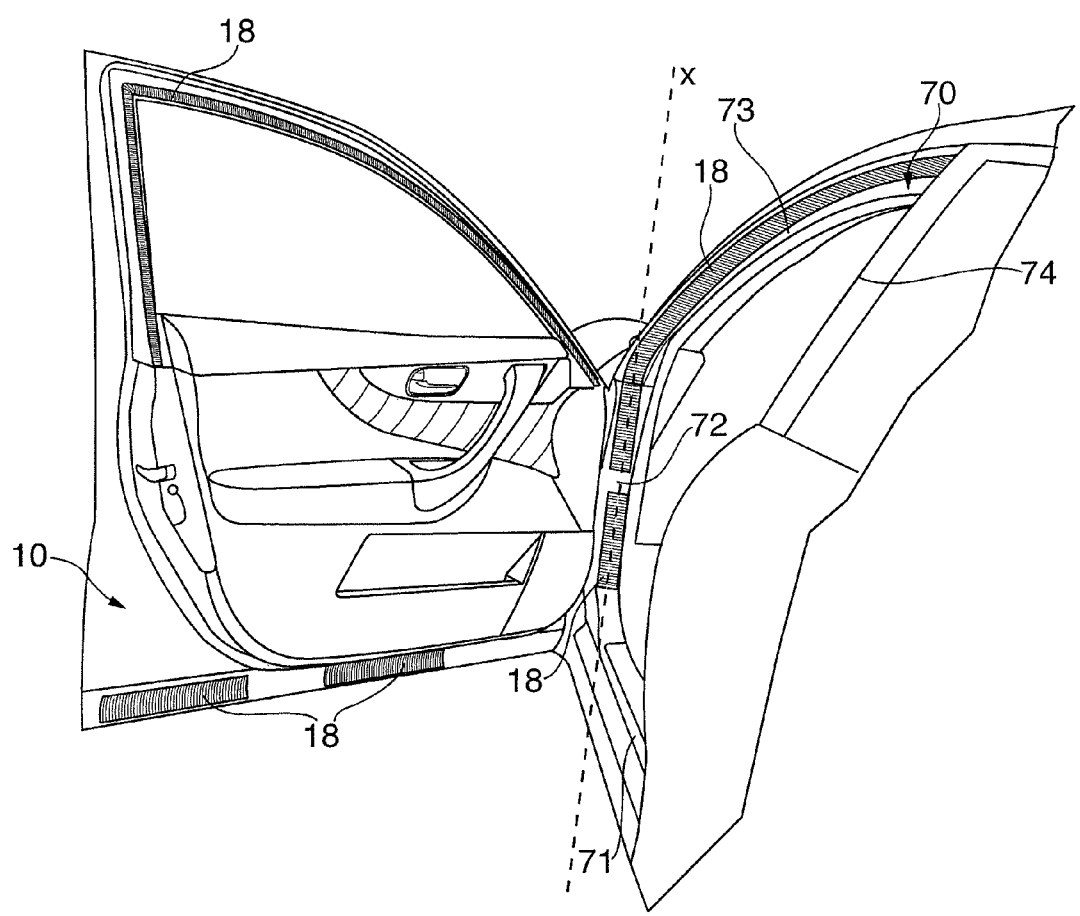
FIG. 18 is a view similar to FIG. 17, but with the luminant component extending along the forward and upper door frame portions of the motor vehicle door frame.

In further embodiments of the present invention, as illustrated in FIGS. 17 and 18, luminant component 18 is attached to the vehicle door frame 70 and preferably to the door frame of the side door of a vehicle. Particularly, as seen in FIG. 17, a conventional motor vehicle side door frame 70 includes a generally horizontal lower door frame portion 71, connected on its forward end to the lower end of a generally vertical forward door frame portion 72. The upper end of forward door frame portion 72 is connected to the forward end of a generally horizontal upper door frame portion 73. The rear end of upper door frame portion 73 is connected to the upper end of a generally vertical rear door frame portion 74. The lower end of rear door frame portion 74 is connected to the rear end of lower door frame portion 71. Lower door frame portion 71, forward door frame portion 72, upper door frame portion 73, and rear door frame portion 74 collectively form vehicle door frame 70 and define an opening collectively therebetween to allow a driver and/or passenger to enter and/or exit the vehicle.

A conventional motor vehicle door 10 is hingeably connected to the motor vehicle door frame 70, typically with one or more hinges disposed along a portion of forward door frame portion 72. An axis x runs generally vertically through the door hinges. The hinges permit the door 10 to hingeably pivot along axis x to open and close door 10. Door 10 is also configured and dimensioned to releasably engage with door frame 70 when in its closed position. However, the exact arrangement and configuration of door 10 and door frame 70 vary depending on the specific make and model of the vehicle.

In the embodiments of the present invention shown in FIGS. 17 and 18, one or more luminant components 18 are applied to door frame 70. Particularly, in the embodiment shown in FIG. 17, luminant components 18 are applied to and overlie the forward door frame portion 72 of door frame 70, to reflect light outwardly from door frame 70. Preferably, the luminant components 18 are applied adjacent to but not overlying the door hinges, on forward door frame portion 72. In the embodiment shown in FIG. 17, luminant components 18 are also applied to lower door flange 56 as well as upper window frame 12.

In the embodiment illustrated in FIG. 18, the luminant components 18 are applied to and overlie both the forward door frame portion 72 and the upper door frame portion 73, to reflect light outwardly from door frame 70, to increase the visibility of the door frame 70 of the vehicle. However, luminant component 18 can also be affixed solely to upper door frame portion 73. When illuminated, luminant components 18 are passively reflective, reflecting light from an external source, such as from headlights of other vehicles and, therefore, can be seen in the dark.

Accordingly, when door 10 is open exposing luminant components 18 which have been applied to the vehicle door frame 70, the door frame 70 has increased visibility, such as to cars approaching from the rear of the vehicle and serves as a safety feature to a person entering or exiting the vehicle. Furthermore, when door 10 is opened, the upper door frame portion 73 becomes visible before forward door frame portion 72. Accordingly, as the door 10 is opened, the rear end of upper door frame portion 73 becomes visible followed by the middle and front end of upper door frame portion 73, and next forward door frame portion 72 becomes visible. Thus, when opening door 10, varying degrees of door frame 70 with luminant component 18 applied thereto, are exposed and visible to another car approaching from the rear of the vehicle. Thus, luminant components 18 cause door frame 70 to be visible when the door 10 is opened along various degrees of axis x, serving as a safety feature even when door 10 is only partially opened.

In the embodiments in FIGS. 17 and 18, it is preferable that the luminant components 18 are arranged and affixed to door frame 70 such that luminant components 18 are visible when the door 10 is opened, but are concealed by the vehicle door 10, when the door 10 is closed. Particularly, it is preferable that the shape and placement of the luminant components 18 on the door frame 70 mirror the shape and configuration of the portion of door 10 which engages with door frame 70, so that the luminant components 18 overlie the portion of the door frame 70 which is concealed when door 10 is in its closed position. In such an arrangement, the luminant component 18 does not interfere with the driver's vision from inside of the vehicle or otherwise distract from the interior appearance of the vehicle, when door 10 is closed.

Furthermore, luminant components 18 can be applied to a portion of forward door frame portion 72 and/or upper door frame portion 73 or the entire forward and/or upper door frame portions 72 and 73. As seen in FIG. 17, luminant component 18 may consist of a plurality of spaced-apart luminant components 18. Furthermore, the placement, size, and dimensions of the luminant components 18 on door frame 70 can vary. Additionally, the luminant component 18 in the embodiments in FIGS. 17 and 18 is preferably a non-electrically powered reflective adhesive strip having an outer exposed surface which is passively reflective and an inner underside surface which is adhesive and is applied directly to door frame 70. Alternatively, luminant component 18 may be a reflective paint applied to door frame 70. In another alternative luminant component 18 further includes electrically-powered means for lighting, as described more fully above.

There have been described and illustrated herein several embodiments of a luminant component for a motor vehicle door window frame. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed. For example, the present invention can be adapted to other doors having windows, provided that the luminant component is visible through the window. Furthermore, the present invention can be applied to other windows such as fixed windows on a vehicle, such as the windshield or rear window, or other moveable windows that are not retractable, such as pivotably openable windows.

Furthermore, although the luminous trim is preferably lit by one or more LED's or the like, other means of illumination may be possible. In addition, although the U-shaped and J-shaped window frames are believed to be the most common, the configuration and positioning of the luminant trim may be modified to suit various vehicle types and window frames as long as the visibility aspects of the luminant trim is maintained as discussed above.

The invention claimed is:

1. A motor vehicle door assembly, comprising:
   a motor vehicle door frame of a side door of the motor vehicle, said door frame including at least a forward door frame portion and an upper door frame portion;
   a motor vehicle door which is hingeably connected to said motor vehicle door frame and configured and dimensioned to releasably engage with said motor vehicle door frame; and
   a highly reflective luminant component applied to overlie at least a portion of said motor vehicle door frame, so that said luminant component reflects light from an external source, outwardly from said motor vehicle door frame; and
   wherein said luminant component is applied to overlie a member selected from the group consisting of at least a portion of said forward door frame portion, at least a portion of said upper door frame portion, and at least a portion of said forward door frame portion and at least a portion of said upper door frame portion.

2. The motor vehicle door assembly according to claim 1, wherein:
   said motor vehicle door frame further comprises a lower door frame portion, and a rear door frame portion, which, in combination with the forward door frame portion and the upper door frame portion, collectively define an opening therebetween.

3. The motor vehicle door assembly according to claim 1, wherein:
   said luminant component is arranged on said motor vehicle door frame such that said luminant component is visible when said motor vehicle door is open and is concealed when said motor vehicle door is closed.

4. The motor vehicle door assembly according to claim 1, wherein:
   said luminant component further comprises means for lighting said luminant component.

5. The motor vehicle door assembly according to claim 1, wherein:
   said luminant component is at least one reflective adhesive strip.

6. The motor vehicle door assembly according to claim 1, wherein:
   said luminant component is reflective paint.

7. The motor vehicle door assembly according to claim 1, wherein:
   said luminant component comprises a plurality of spaced apart luminant components applied to overlie at least a portion of said motor vehicle door frame.

8. The motor vehicle door assembly according to claim 1, wherein:
   said luminant component extends substantially the entire length of said forward door frame portion of said motor vehicle door frame.

9. The motor vehicle door assembly according to claim 1, wherein:
   said luminant component extends substantially the entire length of said forward door frame portion and said upper door frame portion of said motor vehicle door frame.

10. The motor vehicle door assembly according to claim 1, wherein:
said luminant component extends substantially the entire length of said upper door frame portion of said motor vehicle door frame.

* * * * *